3,105,892
HUMIDIFIER HEATER
Andrew S. Knapp, St. Louis, Mo., assignor to Knapp-Monarch Company, St. Louis, Mo., a corporation of Delaware
Filed June 6, 1960, Ser. No. 34,197
1 Claim. (Cl. 219—38)

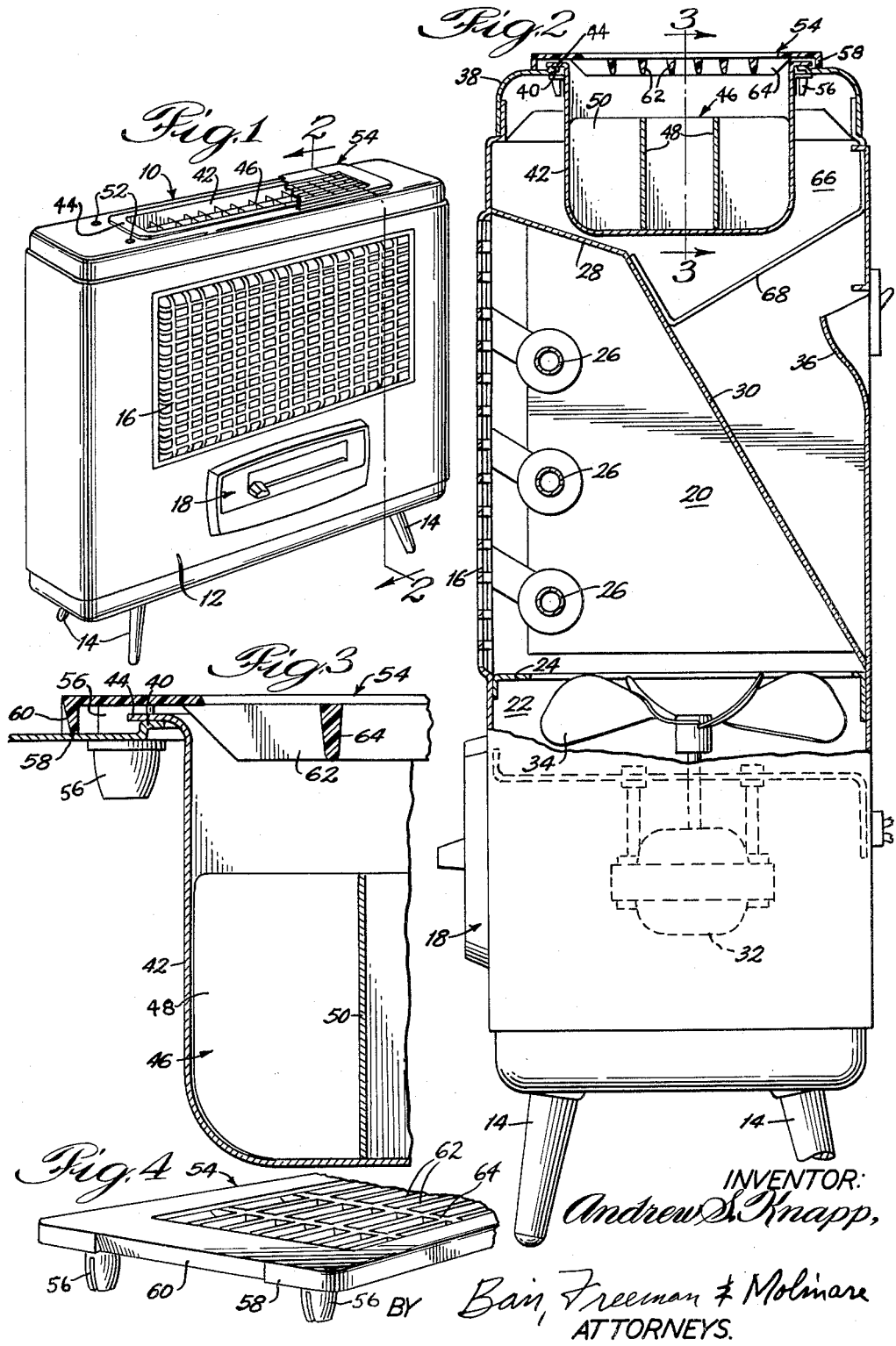

This invention relates to a humidifying heater or vaporizing heater, and more particularly relates to a portable, electrical space heater which is provided with humidifying means therein.

The use of portable, electrical space heaters has increased in recent years, but the mere provision of dry heat without accompanying humidification has well known drawbacks. It is, therefore, desired to provide a portable, electrical space heater having means therein for humidifying the space to which heated air is being delivered by the heater.

In past attempts to provide a portable, electrical, humidifying heater, there has arisen problems incident to the leakage of water from the humidifying-water reservoir to the interior of the heater casing, thereby creating problems relating to the presence therein of the electrical heating elements. Furthermore, because of desired portability of an electrical space heater, the providing of humidifying water creates a problem relating to water splashing from the water reservoir while the heater is being moved.

Still further, prior attempts to provide humidifying means for an electrical space heater has resulted in rather complex designs in providing for a readily refillable water reservoir.

It is, accordingly, one of the objects of this invention to provide an electrically energized heater which avoids all the foregoing problems and is of simple but effective design.

It is another object of this invention to provide a humidifying means for an electrical space heater, wherein arrangements are made to prevent dripping of water from the reservoir to the interior of the casing which houses the electrical means.

A further object of this invention is to provide a water reservoir means for an electrical space heater, which water reservoir means may be easily and quickly removed and refilled.

Still another object of this invention is to provide a space heater with humidifying means, wherein means are provided for limiting splash from the water reservoir of the humidifying means.

In the design of an electric space heater with humidifying means, it has been observed that the electrical heating elements generate rather intense heat and this factor is undesirable in close association with a supply of humidifying water because of the tendency of the heating elements to effect rapid vaporization of the supply of humidifying water. It is, of course, preferable to supply a humidifying heater wherein, under ordinary operating conditions, it would not be necessary to re-fill the humidifying-water reservoir at frequent intervals.

Accordingly, it is still another object of this invention to provide an electric space heater with humidifying means, and wherein the heating means and humidifying-water reservoir are so arranged and designed as to effect a relatively slow consumption of the humidifying water.

Further objects and advantages of this invention will become apparent as the following description proceeds, and the features of novelty which characterize this invention will be pointed out with particularity in the claim annexed to and forming part of this specification.

A preferred embodiment of the invention is shown in the accompanying drawing, in which:

FIGURE 1 is a perspective view, with parts broken away, showing an electrically energized space heater provided with humidifying means as disclosed in this application.

FIGURE 2 is an enlarged view, partially in cross-section, taken substantially on line 2—2 of FIGURE 1.

FIGURE 3 is a further enlarged, fragmentary, cross-section view taken substantially on line 3—3 of FIGURE 2, and illustrates details of construction which are emphasized in this application; and FIGURE 4 is a fragmentary, perspective view of the cover which overlies the humidifying water container carried by the space heater.

Referring now to the drawings, there is shown in FIG. 1 an electrically energizable, portable, space heater generally indicated at 10. The space heater includes a casing 12 which is mounted on a plurality of legs 14 and which presents a laterally facing discharge grill 16 through which heated air is discharged from the space heater 10 into the region which is desired to be heated. Positioned below the grill 16 is a combination name plate and control means, generally indicated at 18, the control means being adapted to control the temperature and/or rate of discharge of the heated air emanating from the space heater 10.

More particularly, the interior of space heater 10, as best seen in FIG. 2, is divided into an upper chamber 20 and a lower chamber 22 by an orificed, horizontal wall 24. A plurality of finned electrically energized heater elements 26 are positioned in chamber 20 spaced rearwardly of the grill 16. Internal walls 28 and 30 are provided which partially bound the upper chamber 20 and cooperate to laterally direct the air, which enters chamber 20 through orificed wall 24, and over the heater elements 26 and through the grill 16. Positioned in the lower chamber 22 is an electrically energized motor means 32 which drives a vertically positioned fan 34 which operates to drive air through the orificed wall 24, across heaters 26, and laterally through grill 16. The back wall of casing 12 is provided with a detented portion 36 which assists in defining a hand grasp means on casing 12 which permits a person to pick up the space heater 10 and move it to selected positions within a room.

The casing 12 is provided with an upper casing part 38 which has been formed by stamping or the like to define an upwardly opening, container-receiving, generally rectangular, aperture that is surrounded by a continuous, peripheral rim 40 which projects upwardly relative to the remainder of casing part 38. There is provided a water container 42, which is preferably formed of aluminum. The major portion of container, or pan, 42 is of a dimension to permit fitting the container loosely through the aperture in casing part 38, to the position shown in FIGS. 2 and 3.

The container 42 is provided with a continuous, outwardly projecting, peripheral flange 44 which is arranged for engaging the peripheral rim 40, so as to support the container 42 within the casing 12. The size of container 42 and the dimension of the continuous flange 44 are so related to the size of the container-receiving aperture in casing part 38 and to the dimension and positioning of the continuous peripheral rim 40, that the entire outermost edge of continuous flange 44 is located outwardly relative to the continuous rim 40 when the container 42 is supported on the rim 40. This arrangement provides that in the event any water drips from flange 44, all such drip will be deposited on the casing outwardly of the rim 40, so that the upstanding rim 40 serves as a barrier to prevent entry of water into the casing through the said containing receiving aperture in casing part 38.

Positioned within the container 42 is an egg-crate-liner type of insert 46. The insert 46 is of a criss-cross configuration and may be constructed of metal or plastic, and is formed with a plurality of relatively long, longitudinal wall members 48 which are intersected by a large plurality of relatively short, transverse wall members 50, the arrangement being such as to define a multiple number of cells in the lower portion of the water container 42 which operates to subdivided the body of water within the container 42. By so subdividing the water body, the tendency of water to splash outwardly from the container 42 is greatly reduced. Alternatively to insert 46, there may be provided sponge like liners, or fibrous pads of natural or synthetic material, or absorbent bodies. However, the design criterion which controls is to provide as great a water carrying capacity in container 42 without having bad splash characteristics. While some bodies having small voids, or spaces, inhibit splash more than the liner 46 illustrated, the liner 46 seems to be a good compromise because it does not reduce the water carrying capacity of container 42 as much as do the bodies with smaller voids therein. Preferably the liner in the bottom of container 42 should have as small a mass as possible and should occupy no more than $1/10$ of the volume of container 42 before water is put into the pan 42.

A cover means is provided for overlying the open top of the water container 42. Referring now to the details thereof, the upper casing part 38 is provided on the top thereof, inwardly of the edges of casing 12, with a plurality of spaced plug-receiving apertures 52 which are disposed outwardly of the embossed, peripheral, rim 40 and outwardly of the flange 44 of the container 42 when the container 42 is supported in the casing 12. There is provided a moulded cover member, generally indicated at 54, having a plurality of retainer plugs 56 defined thereon of a size and spacing to be press-fit through the plug-receiving apertures 52. The plugs 56 are preferably bifurcated, as best seen in FIG. 4, and the spacing between the parts of each plug member 56 permits of the necessary distortion thereof in press-fitting the plugs 56 through the apertures 52, and sufficient friction is generated between the parts to snugly retain the cover 54 in position on the casing 12. The cover 54 is formed with a downwardly extending peripheral flange 58 located outwardly relative to the plug-receiving apertures 52 but inwardly of the edges of the top of casing 12, and said flange 58 cooperates with the casing 12 for locating the main portion of cover 54 in spaced relation above the peripheral flange 44 of the water container. The portions of flange 58, at the short edges of the generally rectangular cover member 54, are recessed as at 60 to provide finger receiving recesses therein to assist in removing the cover 54 from the casing.

The central portion of the cover 54 is formed with a plurality of downwardly extending long rib members 62 intersected, in grill-like fashion, by a plurality of downwardly extending short rib members 64, and the cooperation of the rib members 62 and 64 is such that said grilllike portion of the cover 54 enters and projects into the upper portion of the water container 42, and operates to limit splash of water outwardly from the container 42 by providing a multiplicity of walls for interception of such water splash.

The arrangement as herein described has been found to provide a very efficient construction, as the embossed peripheral rim 40 raises the flange 44 above the casing part 38 so that a user can grip the protruding edges of flange 44 and easily lift the water container 42 out of the casing 12. The container 42 is adapted to hold about two quarts of water, without filling it completely to the top; and, being made of aluminum, it resists corrosion. The cover 54 is easily removed from the casing 12 by gripping the short edges at the finger recesses 60 and by pulling upwardly, thereby exposing the water container 42 for refilling purposes. It will be further seen that a peripheral, non-apertured portion of the cover 54 is positioned outwardly relative to the open top of the pan 42, so as not to obstruct exposure of the surface area of the water within pan 42, thereby providing a relatively large area adapted to evaporate water into the room being heated.

The pan 42 projects into a chamber 66 defined in casing 12, which chamber is in part bounded by the walls 28, 30, and an inclined internal wall 68 which extends between wall 30 and the rear wall of the casing, so that the chamber 66 is substantially isolated from said upper chamber 20 of the space heater. The heat from the heater elements 26 is, nevertheless, transmitted sufficiently through the internal walls of the casing 12 to the pan 42 so as to provide heat which stimulates evaporation of the water in pan 42 so that such evaporation will be in proportion to the moisture requirements in the room. If the heater controls are calling for more heat so that the heater elements 26 are caused to deliver more heat, then the additional heat assists, in part, in causing vaporization of the water from the pan 42 into the room, and on the other hand, if less heat is demanded and delivered, there is less vaporization.

It will be observed, as best seen in FIGURE 2, that the pan 42 is close to, but spaced from the walls which bound the upper heater chamber 20. This factor is, in combination with other features disclosed, very important because such close spacing of pan 42 from wall 28 greatly reduces the degree of heat transferred from heaters 26 to the water in pan 42 and thereby greatly affects the rate of vaporization of the water in pan 42. For example, in equivalent tests conducted at a selected humidity of 85%, when the pan 42, filled with two quarts of water, engaged the wall 28 so as to conduct heat from wall 28 to the water in pan 42, the contents of pan 42 were evaporated in less than 2½ days, while when pan 42 was spaced from wall 28, the contents of pan 42 lasted about 4½ days. It is also of importance that heaters 26 be finned because a heater without fins yields too intense a heat, which again tends to accelerate vaporization of the contents of pan 42. On the other hand, a finned heater 26 will provide the same total heat to a room while reducing the temperature concentration adjacent the heater, and thereby extends the period of time that will lapse before it is again necessary to fill pan 42 with humidifying water.

While there has been shown and described a particular embodiment of this invention, it will be obvious to those skilled in the art that various changes and modifications may be made therein without departing from the invention and, therefore, it is intended in the appended claim to cover all such changes and modifications as fall within the true spirit and scope of the invention.

What I claim as new, and desire to secure by Letters Patent of the United States, is:

In a vaporizing heater including a casing having a top wall, electric heating means in said casing, and vaporizing means including a water container carried by said casing adjacent the heating means for providing humidifying water vapor to the atmosphere being heated by said heating means; the improvement in said vaporizing heater comprising, in combination: means in said casing defining an upwardly opening, container-receiving aperture in said top wall surrounded by a continuous rim which projects upwardly relative to the remainder of the casing; a water container fitting into said aperture in said casing and having a continuous, outwardly projecting peripheral flange for engaging said rim on the casing and to be supported thereby; said continuous flange having portions thereof projecting outwardly of said continuous rim when the container is supported on said rim so that said flange overlaps said top wall in spaced apart relation to said top wall, so that any drip of moisture from the container flange is deposited on said casing outwardly of said rim, so that said rim prevents entry of liquid into said casing through said container-receiving aperture; means positioned in said water container in the bottom thereof for limiting splash of water outwardly from said container; and a foraminous cover removably carried by said casing and overlying the water container, and a plurality of downwardly extending projections, which are arranged in grill-like fashion on the under side of said cover and which enter and project into the upper portion of the water container, to limit splash of water outwardly from said container.

References Cited in the file of this patent

UNITED STATES PATENTS

| | | |
|---|---|---|
| 1,472,569 | Scurlock | Oct. 30, 1923 |
| 1,594,074 | Shuell et al. | July 27, 1926 |
| 1,763,328 | Robinson | June 10, 1930 |
| 1,788,515 | Gannon | Jan. 13, 1931 |
| 1,900,956 | Somersall | Mar. 14, 1933 |
| 1,908,559 | Roser | May 9, 1933 |
| 1,945,815 | Landerman | Feb. 6, 1934 |
| 2,008,945 | Child | July 23, 1935 |
| 2,008,963 | Mack | July 23, 1935 |
| 2,177,822 | Domek | Oct. 31, 1939 |
| 2,762,886 | Visos | Sept. 11, 1956 |

FOREIGN PATENTS

| | | |
|---|---|---|
| 81,185 | Sweden | Aug. 14, 1934 |
| 806,893 | France | Oct. 5, 1936 |
| 856,676 | France | Mar. 23, 1940 |